United States Patent [19]

Teshima et al.

[11] Patent Number: 5,166,122
[45] Date of Patent: Nov. 24, 1992

[54] PROCESS FOR PRODUCING A DENITRATION CATALYST

[75] Inventors: Nobue Teshima; Yasuyoshi Kato, both of Kure; Takashi Michimoto, Hiroshima, all of Japan

[73] Assignee: Babcock-Hitachi Kabushiki Kaisha, Tokyo, Japan

[21] Appl. No.: 617,413

[22] Filed: Nov. 21, 1990

Related U.S. Application Data

[63] Continuation of Ser. No. 408,612, Sep. 18, 1989, abandoned.

[30] Foreign Application Priority Data

Sep. 19, 1988 [JP] Japan ............... 63-234224

[51] Int. Cl.$^5$ .............. B01J 23/22; B01J 23/28
[52] U.S. Cl. ............... 502/309; 502/312; 502/321; 502/327; 502/350; 502/354
[58] Field of Search .......... 502/309, 312, 350, 353, 502/321, 322, 354

[56] References Cited

U.S. PATENT DOCUMENTS

| | | | |
|---|---|---|---|
| 4,333,858 | 6/1982 | Decker et al. | 502/309 |
| 4,370,262 | 1/1983 | Takahashi et al. | 502/350 |
| 4,466,947 | 8/1984 | Imanari et al. | 502/340 |
| 4,847,234 | 7/1989 | Hums | 502/338 |
| 4,849,392 | 7/1989 | Hums et al. | 502/216 |
| 4,851,381 | 7/1989 | Hums | 502/209 |
| 4,925,825 | 5/1990 | Tachi et al. | 502/309 |

FOREIGN PATENT DOCUMENTS

| | | | |
|---|---|---|---|
| 0094643 | 7/1980 | Fed. Rep. of Germany | 502/309 |
| 3634335 | 4/1988 | Fed. Rep. of Germany | 502/309 |

*Primary Examiner*—Anthony McFarlane
*Attorney, Agent, or Firm*—Fay, Sharpe, Beall, Fagan, Minnich & McKee

[57] ABSTRACT

A process for producing a denitration catalyst suitable for catalytically reducing nitrogen oxides in exhaust gases having a low dust content with ammonia is provided, which process comprises adding water to catalyst raw materials affording titanium oxide, molybdenum oxide and vanadium oxide at the time of calcination respective proportions thereof being in the range of Ti/Mo/V=97-65/3-20/0-15 atomic %, to make slurry, followed by coating the slurry onto a metal substrate and drying. Molybdenum oxide particles are coated on a titanium oxide particle at calcination, which makes the grindability of the catalyst particle easy and improve its adherence to the metal substrate.

15 Claims, 7 Drawing Sheets

FIG.1

(A) METAL SHEET (B) LATH PROCESSING AND SLITTING (C) EXPANDING (C)

PROCESS FOR PRODUCING A DENITRATION CATALYST

This is a continuation of copending Ser. No. 408,612 filed Sept. 18, 1989, now abandoned.

BACKGROUND OF THE INVENTION

1. Field of the Invention

This invention relates to a process for producing a denitration catalyst. More particularly it relates to a process for producing a denitration catalyst suitable for catalytically reducing nitrogen oxides contained in exhaust gases of a low dust content with ammonia. The exhaust gases of a low dust content refers to those discharged from combustion of gas or liquid fuels such as LPG, naphtha, light oil and the like petrorium fractions.

2. Description of the Related Art

Nitrogen oxides (NOx) in exhaust gases discharged from various boilers and the like are atmosphere-pollutive substances together with sulfur oxides (SOx).

As processes for removing the NOx, various ones have been proposed and among these, a process of selectively reducing NOx with ammonia added to exhaust gases in the presence of a catalyst has been mainly utilized. As such catalyst, various catalysts using titanium oxide as a base compound have been proposed (Japanese patent application laid-open No. Sho 50-128681/1975 and No. Sho 53-28148/1978) and have currently been practically used.

In the case where exhaust gases containing no dust such as LPG combustion gases are treated, a highly active and economical catalyst is required; thus besides those obtained by molding a catalyst itself into a honeycomb form or a spherical form, those obtained by coating catalyst compounds onto a ceramics honeycomb-form substrate or a metal substrate have been proposed to reduce the quantity of the catalyst compounds used. However, a catalyst obtained by merely coating catalyst compounds onto a metal substrate has a drawback that it has a low catalyst strength and a small quantity of the catalyst compounds supported there on so that it is difficult to retain its high activity.

In order to overcome the drawback, various processes have been proposed such as a process of improving the catalyst strength by adding various binders to catalyst compounds (Japanese patent application laid-open No. Sho 49-58093/1974), a process of roughening the metal surface, thereby increasing the quantity of the catalyst compounds supported thereon to obtain a high activity of the catalyst (Japanese patent application laid-open No. Sho 51-116168/1976), etc. However, such problems have been raised that when binders are added to improve the catalyst strength, the catalyst activity lowers, while when the metal surface is roughened and increased with the catalyst compounds supported thereon, the catalyst compounds are liable to peel off from the substrate.

Further, in the case where a sheet-form catalyst obtained by having catalyst compounds supported on a metal plate substrate is used, it has been required to make the plate catalyst thinner than conventional catalysts so that the distance (clearance) between the plate catalysts provided inside the flow path of exhaust gases can be narrowed to make the catalyst apparatus compact and reduce the quantity of the catalyst compounds used, thereby saving the cost. Further, it is desired that the catalyst performance should not be lowered than that of a conventional catalyst.

SUMMARY OF THE INVENTION

The object of the present invention is to provide a process for producing a denitration catalyst having overcome the above-mentioned drawbacks of the prior art and even when the quantity of the catalyst supported on a metal substrate is small, capable of obtaining a catalyst having a high activity and a superior resistance to peeling-off.

The present invention resides in:

(1) A process for producing a denitration catalyst for reducing nitrogen oxide contained in an exhaust gas with ammonia, which comprises adding water to catalyst raw materials affording titanium oxide, molybdenum oxide and vanadium oxide at the time of calcination, respective proportions thereof being in the range of Ti/Mo/V = 97-65/3-20/0-15 in an atomic percentage, to make a slurry, the water content in said slurry being made 35 to 50% by weight, followed by having said slurry supported on a metal substrate, and drying, and (2) A denitration catalyst for reducing nitrogen oxides contained in an exhaust gas with ammonia, which comprises titanium oxide, molybdenum oxide and vanadium oxide supported on a metal substrate, respective proportions thereof being in the range of Ti/Mo/V = 97-65/3-20/0-15 in an atomic percentage, particle size of molybdenum oxide being smaller than that of titanium oxide, and the molybdenum oxide particles adsorbing around the titanium oxide particle.

DETAILED DESCRIPTION OF PREFERRED EMBODIMENTS

The catalyst according to the present invention comprises titanium oxide, molybdenum oxide and vanadium oxide supported on a metal substrate, and the respective proportions thereof used are in the range of Ti/Mo/V=97-65/3-20/0-15 in an atomic percentage. A preferable proportion of Mo is in the range of 5 to 15 in an atomic percentage. If the proportion of molybdenum used is less than 3 in an atomic percentage, resistance to peeling-off is inferior, while if it exceeds 20, the effectiveness of resistance to peeling-off is not more improved. Further, vanadium oxide is not essential to be added, but if it is added to titanium oxide and molybdenum oxide, it is possible to obtain a catalyst having a further higher activity, but if its proportion used exceeds 15 in an atomic percentage, more effectiveness is not obtained.

Catalyst raw materials used in the present invention are not limited, if they afford titanium oxide, molybdenum oxide or vanadium oxide at the time of calcination of a catalyst. That is, any compounds of Ti, Mo or V capable of forming an aqueous slurry thereof such as metatitanic acid, ammonium molybdate, ammonium metavanadate, etc. are usable.

When the above catalyst compounds are calcined before slurrying or being supported on a substrate, the shrinkage of catalyst particles after supported is small and a catalyst having a small particle size of catalyst compounds is obtained. Namely, since molybdenum oxide ($MoO_3$) has a high vapor pressure, it vaporizes at calcination and coats or adsorbs on the surface of $TiO_2$ particles so that $MoO_3$ is present between the respective $TiO_2$ particles. Thus, even when the catalyst compounds are formed into a definite shape and again calcined, $TiO_2$ particles do not adhere to one another to crystallize or sinter, but remain in the form of small particles, and also there occurs no shrinkage at calcination due to sintering; hence it is possible to obtain a dense and strong catalyst product. Further, since catalyst compounds are present in the form of fine particles, it is possible to obtain a slurry having a high concentration and a high stability without any additives at the time of slurry preparation. The calcination temperature is preferred to be 500° C. or higher.

In addition, since $MoO_3$ has a good compatibility with the metal substrate and increases the contact area at the time of calcination, the adhesion of the catalyst compounds to the substrate is remarkably improved.

The metal substrate used in the present invention has no particular limitation and any of stainless steel, mild steel, etc. are usable. Further, any of forms such as flat sheet, reticulated form, expanded metal, etc. are usable. In the case of a metal substrate obtained by subjecting the metal surface to spray with molten aluminum, etc. to form a roughened surface, contact of the metal surface with the catalyst compounds is improved as well as the catalyst surface area increases, thereby the catalyst activity and resistance to peeling-off are both improved.

The denitration catalyst according to the present invention is obtained by adding water to the above catalyst compounds to form a slurry, applying the slurry onto the above metal substrate, drying and preferably calcining the resulting material. The slurry concentration may be of such an extent that the slurry can be applied onto the substrate. The process of applying the slurry onto the substrate has no particular limitation. For example, the process may be carried out by immersing the substrate in the slurry, removing superfluous liquid by a centrifugal separator, blowing off, suction, impact or the like means and drying. Thus obtained catalyst is preferably calcined usually at about 500° C.

Figure 2:
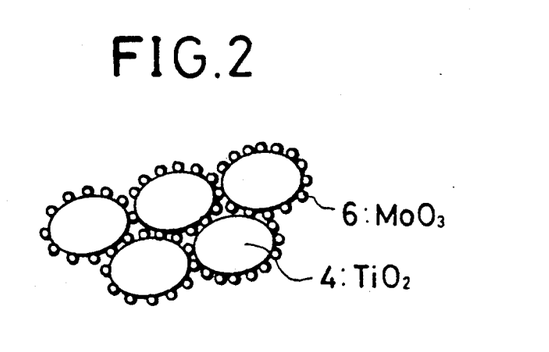
FIG. 2 shows a view illustrating the function of molybdenum at the time of precalcination of catalyst compounds.
Figure 3:
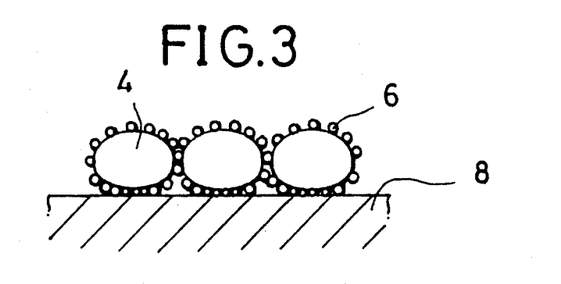
FIG. 3 shows a view illustrating the function of molybdenum at the time of coating catalyst compounds onto a metal substrate and calcining it.

When catalyst compounds comprising titanium compounds and molybdenum compounds are subjected to a primary calcination at about 500° C., $MoO_3$ has a higher vapor pressure at the temperature to coat or adsorb the surface of $TiO_2$ particles as shown in FIG. 2 so that $MoO_3$ 6 is present among the respective $TiO_2$ particles 4; and when the particles are ground, the grindability of the particles is improved to obtain fine particles. When fine particles of catalyst compounds are increased and water is added thereto to form a slurry, it is possible to lower the slurry viscosity even when the particle concentration is high. Hence it is possible to immerse a substrate in a high concentration slurry and have the slurry supported on the substrate. When the high concentration slurry is supported, it is possible to form a high density catalyst layer having a high strength on the substrate. When catalyst compounds (particles) are supported on a metal substrate, followed by calcination, there is generally raised a problem that the catalyst particles shrink due to sintering of $TiO_2$ particles by heat to generate cracks. Whereas in the case of the present invention, since $MoO_3$ is present among $TiO_2$ particles, contact of $TiO_2$ particles themselves is hindered to prevent $TiO_2$ particles from sintering so that shrinkage due to sintering is reduced and crack generation can be prevented; hence a strength reduction of the catalyst layer does not occur. Further, when calcination is carried out after the catalyst has been supported on a metal substrate 8, $MoO_3$ particles 6 coating $TiO_2$ particles 4 contacts with the metal substrate 8 to react partially therewith, as shown in FIG. 3; hence adhesion of catalyst compounds onto the metal substrate is improved so that the catalyst compounds is not peeled off from the substrate.

The present invention will be described in more detail by way of Examples, but it should not be construed to be limited thereto.

EXAMPLE 1

Ammonium molybdate ($3(NH_4)_2O.7MoO_3.4H_2O$)(3.81 kg) and ammonium metavanadate ($NH_4VO_3$)(1.04 kg) were added to metatitanic acid (50 kg) containing 30% by weight of titanium oxide, followed by kneading the mixture on heating by means of a kneader to obtain a pasty slurry containing 35% by weight of water. This slurry was granulated by an extrusion granulator, followed by drying by a fluidized bed dryer, calcining at 550° C. for 2 hours, grinding the resulting material into powder having a size of 90% or more of 100 mesh pass by means of a hammer mill and adding water to the powder to obtain a slurry. As to the quantity of water added at that time, a water content of 35 to 50% by weight, preferably 40 to 48% by weight afforded superior slurry properties.

Figure 8:
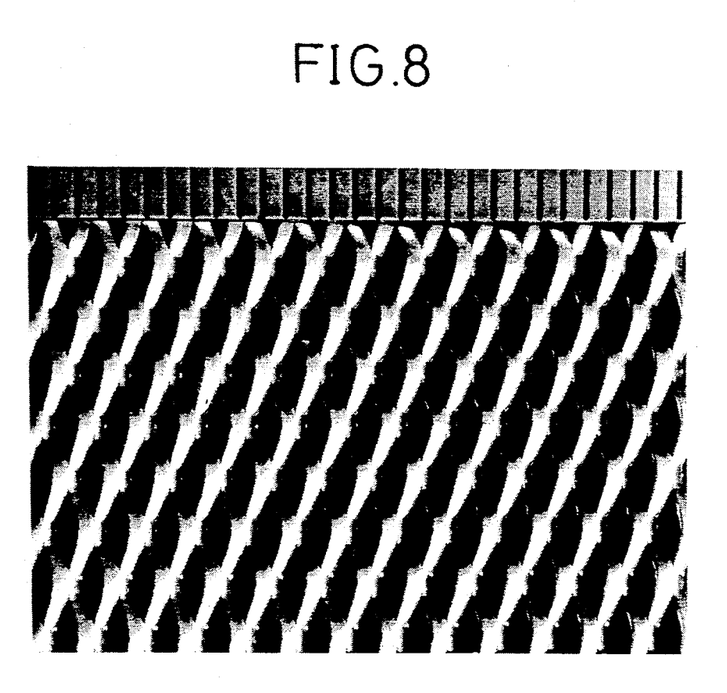
FIG. 8 shows a photograph (×4) of a catalyst using an expanded metal lath as a substrate.

In this Example, water (4.6 kg) was added to the resulting powder (5.4 kg) to obtain a catalyst slurry, followed by immersing in this slurry, a SUS 304 expanded metal lath of 0.2 mm thick, rotating them by means of a centrifugal separator to remove superfluous slurry, drying the resulting material and calcining at 500° C. for 2 hours to obtain a catalyst. The quantity of the catalyst compounds supported was 150 kg/m² per unit surface area of the catalyst. This value is very small as compared with 800 to 1,000 g/m² in the case of a conventional catalyst disclosed in Japanese patent application laid-open No. Sho 63-111945/1988. The surface area in this case refers to a projected area of one surface of the catalyst including the openings of the expanded metal. The object of removing the superfluous slurry by means of a centrifugal separator is to prevent the openings of the expanded metal from clogging with slurry and to obtain a porous metal plate catalyst. As to the process of the centrifugal separation can be replaced by air-flowing, vibration-impacting, etc. In addition, as seen from FIG. 8 showing a plane view of the catalyst, in a magnification of 4, the openings of the expanded metal lath are not filled with the catalyst, but the whole surface area of the catalyst is thinly coated with the catalyst compounds.

Figure 1:
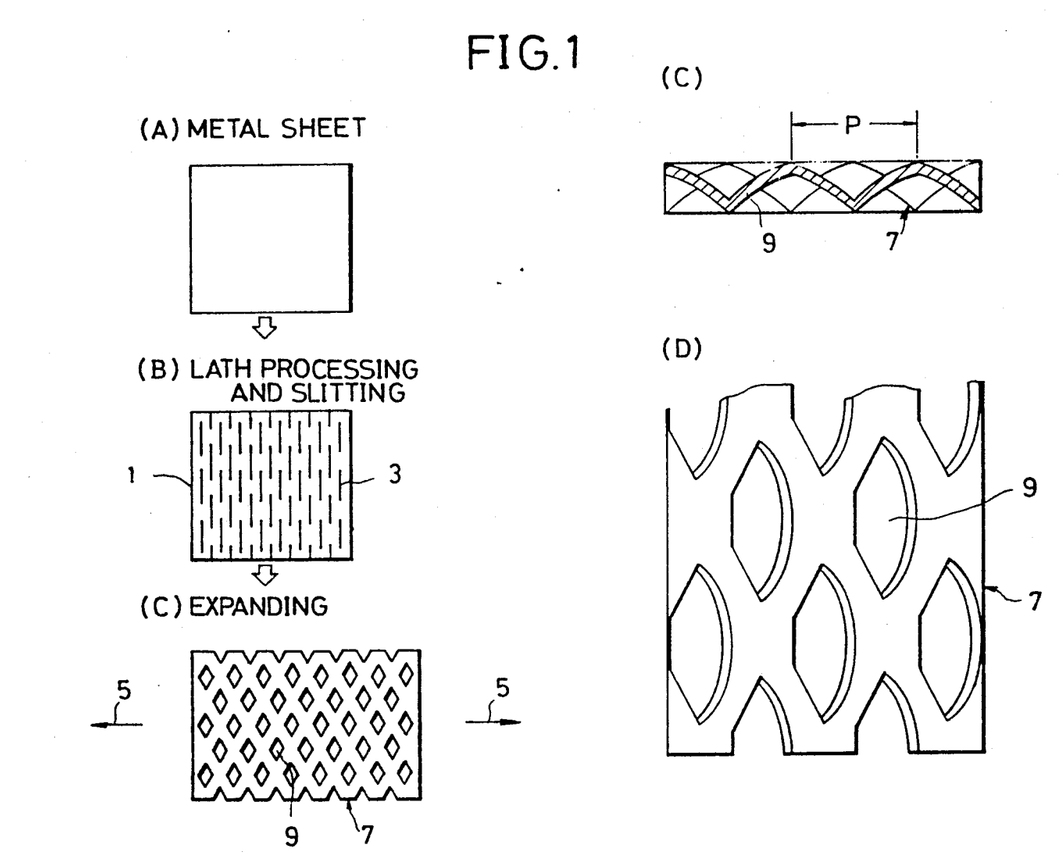
FIG. 1 shows a view illustrating a process for producing an expanded metal lath as a substrate used in the present invention, (A), (B) and (C) showing a process for preparing an expanding metal lath, (C) showing a cross sectional view of the expanded metal lath, and (D) showing a plane view of the expanded metal lath.

A process for producing the above expanded metal lath is illustrated in FIG. 1. A stainless steel sheet (SUS 304) 1 of 0.2 mm thick is cut to have zigzag slits 3 as shown in FIG. 1(A) and (B), followed by expanding the sheet in the direction 5 perpendicular to that of the slits 3 so that the slits are opened to obtain an expanded metal lath 7. The cross-section of the metal 7 is shown in FIG. 1(C) and its plane view is shown in FIG. 1(D). An expanded metal lath of 0.8mm thick is obtained from the stainless steel sheet of 0.2 mm thick. Pitch p of the openings 7 was 22 mm and openings 9 occupied about 79% of the surface area.

EXAMPLE 2-4

Example 1 was repeated except that the quantity of ammonium molybdate added was changed to 1.03 kg, 2.12 kg or 8.29 kg, to obtain a catalyst.

COMPARATIVE EXAMPLE 1

Example 1 was repeated except that no ammonium molybdate was added, to obtain a catalyst.

EXAMPLE 5-7

Example 1 was repeated except that a substrate obtained by subjecting, in advance, a SUS expanded metal to aluminum metal-spray in an oxidation atmosphere in a rate of 50 g/m², 100 g/m² or 250 g/m², used to obtain catalysts.

EXAMPLES 8-11

Example 1 was repeated except that the quantity of ammonium metavanadate added was changed to 0 kg, 0.5 kg, 2.14 kg or 4.39 kg, to obtain a catalyst.

EXAMPLE 12

Example 1 was repeated except that the expanded metal lath was replaced by a SUS flat sheet of 0.2 mm thick, to obtain a catalyst.

EXAMPLES 13 and 14

Example 1 was repeated except that an expanded metal lath obtained by subjecting the substrate to aluminum-spray in an amount of 50 g/m² was used and the quantity of the catalyst compounds supported was changed to 100 g/m² to 200 g/m² by controlling the degree of centrifugal separation, to obtain catalysts.

EXAMPLE 15

Example 1 was repeated except that there was used a substrate obtained by heat-treating an alloy sheet of 50 μm thick consisting of Fe-Cr-Al(Fe: 75%, Cr: 20% and Al: 5% by weight, respectively) at 900° C. to form an $Al_2O_3$ whisker on the surface thereof, to obtain a catalyst.

USE EXAMPLE 1

In order to test the denitration activities of the respective catalysts obtained in the above Examples and Comparative example, the percentage denitrations thereof were measured according to the conditions shown in Table 1.

TABLE 1

| Catalyst dimension | 20 mm × 100 mm |
|---|---|
| Gas composition | |
| NO | 200 ppm |
| $NH_3$ | 240 ppm |
| $CO_2$ | 12% |
| $O_2$ | |
| $H_2O$ | |
| $N_2$ | Balance |
| Gas quantity | 184 l/h |
| Temperature | 350° C. |

In order to test the strength of catalysts, a piece of catalyst (100 mm × 100 mm) was ten times dropped onto an iron plate from a height of 1 m, followed by measuring the weight reduction of the catalyst and obtaining the percentage peeling-off according to the following equation:

$$\frac{\text{catalyst wt. before test (g)} - \text{catalyst wt. after test (g)}}{\text{quantity of catalyst supported (g)}} \times 100 \, (\%)$$

Figure 4:
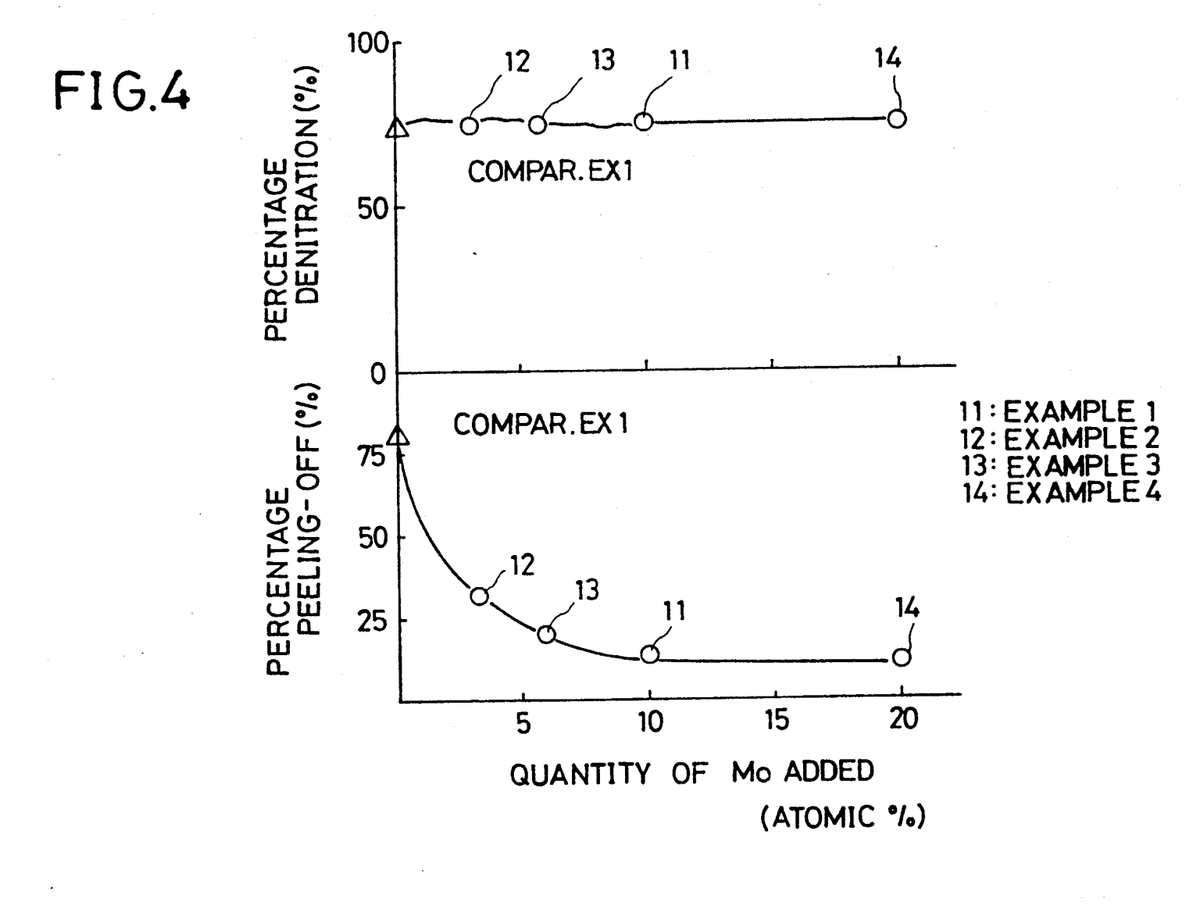
FIG. 4 shows a chart illustrating the relationship between the percentage denitration and percentage peeling-off of catalyst and the quantity of molybdenum added.

FIG. 4 shows a chart obtained by plotting the percentages denitration and the percentages peeling-off of catalysts obtained in Examples 1-4 and Comparative example 1 relative to the quantities of Mo added. As seen from this chart, Mo addition can notably reduce the percentage peeling-off of the catalyst and its quantity added is effective in 3 to 20 atomic %, preferably 5 to 15 atomic %.

Figure 5:
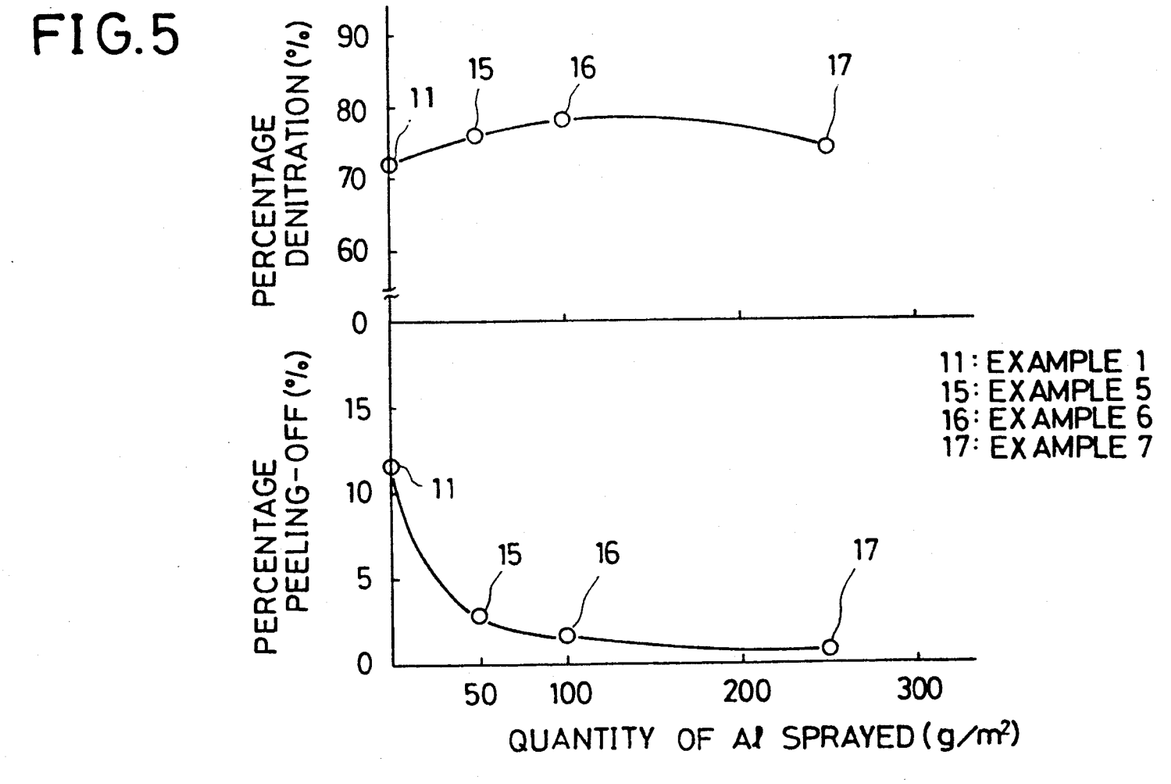
FIG. 5 shows a chart illustrating the relationship between the percentage denitration and percentage peeling-off of catalyst and the quantity of aluminum metal-sprayed.

FIG. 5 shows a chart obtained by plotting the percentages denitration and the percentages peeling-off of the catalysts obtained in Examples 1 and 5-7 relative to the quantities of Al metal spray. As seen from this chart Al metal-spray can further reduce the percentage peeling-off and also can afford a catalyst having a superior activity and strength.

Figure 6:
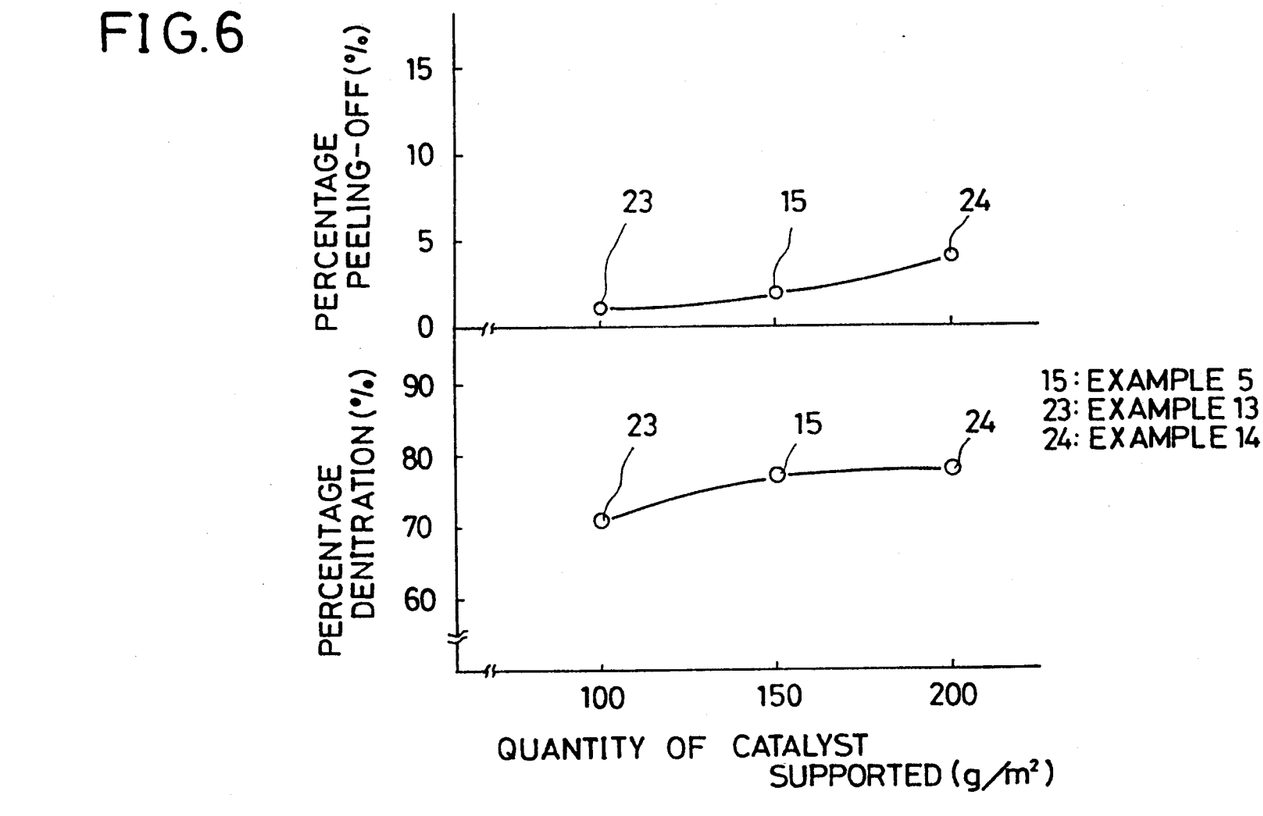
FIG. 6 shows a chart illustrating the relationship between the percentage denitration and percentage peeling-off of catalyst and the quantity of catalyst supported.
Figure 7:
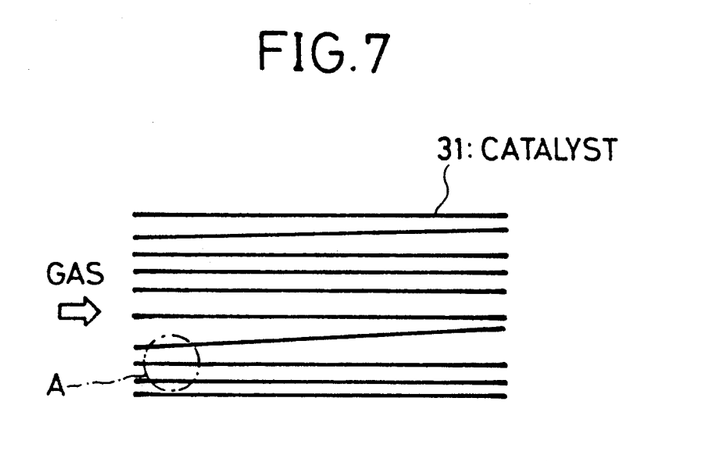
FIG. 7 shows a chart illustrating the state of gas flow in the case where sheet-form catalysts using expanded metal laths as substrates are arranged parallel and incorporated into a unit.
Figure 7A:
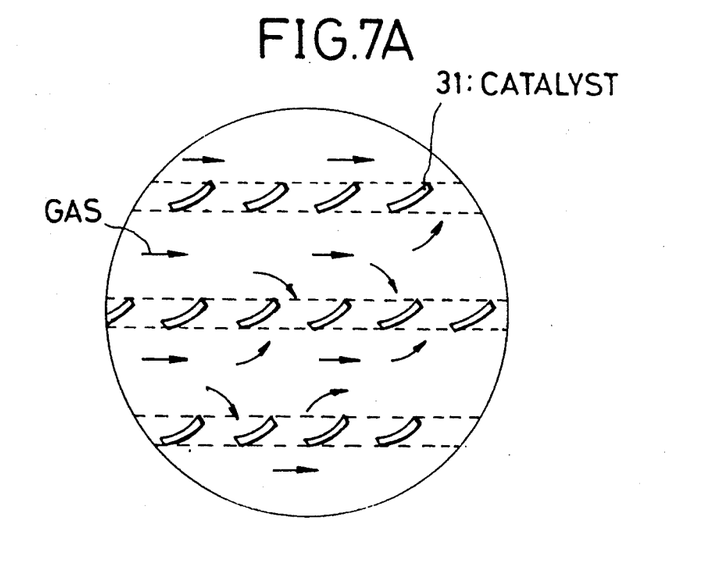
FIG. 7A shows an enlarged cross-sectional view of part A in FIG. 7.

FIG. 6 shows a chart obtained by plotting the percentages denitration and the percentages peeling-off of the catalysts obtained in Examples 5, 13 and 14 relative to the quantities of the catalyst compounds supported. As seen from this chart, even when the quantity of the catalyst supported is 1/5 (150 g/m²) or less that of conventional catalyst (Comparative example 2 described later), the catalysts of the present invention have the same degree of percentage denitration and percentage peeling-off as those in the case of conventional catalyst.

Table 2 shows the measurement results of the percentages denitration and the percentages peeling-off of the catalysts obtained in Examples 8-12 and 15. As seen from this Table, vanadium addition can afford a catalyst having a further higher activity and also as to the form of the substrate, the process of the present invention is applicable not only to an expanded metal lath but also to a flat sheet lath.

TABLE 2

| Ex. | Percentage denitration(%) | Percentage peeling-off(%) |
| --- | --- | --- |
| 8 | 60 | 13 |
| 9 | 68 | 12 |
| 10 | 81 | 12 |
| 11 | 75 | 14 |
| 12 | 72 | 18 |
| 15 | 72 | 5 |

COMPARATIVE EXAMPLE 2

Water (3.4 kg) and inorganic fibers of Kaolin (1.5 kg) were added to the catalyst powder (10 kg) obtained in Example 1, followed by kneading the mixture by means of a kneader to obtain a catalyst paste, applying this paste under pressure onto the same expanded metal substrate as used in Example 1 by means of rolls, air-drying the resulting material and calcining it at 500° C. for 2 hours to obtain a sheet-form catalyst. The quantity of the catalyst compounds supported was 820 g/m$^2$. Its percentage denitration and percentage peeling-off were measured as in the above Use examples 1 and 2 to give 75% and 15%, respectively.

As seen from the above results, the catalyst obtained according to the production process of the present invention has a percentage denitration and a percentage peeling-off to the same degree as that in the case of catalyst obtained according to conventional production process, in 1/5 or less the quantity of the latter catalyst compounds supported.

According to the production process of the present invention, it is possible to obtain a catalyst having a high activity and a superior resistance to peeling-off in a state of a small quantity of catalyst compounds supported. Further, use of an expanded metal lath as a substrate affords an effectiveness mentioned below. A catalyst using a flat sheet as a substrate and a catalyst using an expanded metal lath as a substrate were incorporated in a unit at pitch of 6 mm, respectively, and the respective percentages denitration were compared under the conditions shown in Table 3 listed below. The results are shown also in Table 3.

TABLE 3

| Test conditions: | Catalyst dimension: | 150 mm × 150 mm |
| --- | --- | --- |
| | Length of the unit: | 500 mm |
| | Filling pitch: | 6 mm |
| | Gas quantity: | 172 Nm$^3$/h |
| | Temperature: | 350° C. |
| | [NH$_3$]/[NO] molar ratio: | 1.2 |
| Substrate: | Flat sheet | Expanded metal lath |
| Percentage denitration (%): | 72 | 78.3 |

As seen from the results, the catalyst unit using an expanded metal lath exhibited a higher percentage denitration than that in the case of the catalyst unit using a flat sheet catalyst.

The reason consists in that use of a flat sheet as a substrate causes fluctuations of gas streams between the flat sheet catalysts so that a large quantity of gas flows at a broad path between the sheets, while only a small quantity of gas flows at a narrow path, to cause channeling or deviation of gas stream, thereby reducing the percentage denitration. Whereas, in the case of an expanded metal lath as a substrate, the gas not only flows through paths between the substrates, but also passes through the openings of the expanded metal lath and flows in other paths to reduce channeling. Further, since the gas streams cause turbulence to reduce a boundary film formed along the surface if the catalyst. Thus, use of an expanded metal lath as a substrate makes it possible to obtain a higher percentage denitration than that in the case of use of a flat sheet.

Further, Example 15 shows that even in the case of using a thin sheet of 50 μm thick as a substrate, a catalyst having a small peeling-off and a high activity can be obtained. Further, by using a metal honeycomb substrate of a thin sheet, it is possible to obtain a very compact denitration apparatus.

What we claim is:

1. A process for producing a denitration catalyst for reducing nitrogen oxide form combustion exhaust gases, comprising the steps of:

kneading together a titanium oxide precursor compound capable of forming an aqueous slurry, a molybdenum oxide precursor compound capable of forming an aqueous slurry, and a vanadium oxide precursor compound capable of forming an aqueous slurry in the presence of water to obtain a resulting kneaded material;

drying the resulting kneaded material;

calcining the resulting kneaded material to obtain a resulting calcined material comprising titanium oxide, molybdenum oxide and vanadium oxide, the calcined material including about 65–97 atomic percent Ti, about 3–20 atomic percent Mo, and up to about 15 atomic percent V;

grinding the resulting calcined material to form a powder;

adding water to the powder to prepare a slurry, the water content comprising between about 35 and 50% by weight of the slurry; and drying and calcining the slurry to form a solid denitration catalyst.

2. A process for producing a denitration catalyst for reducing nitrogen oxide according to claim 1, wherein Mo is present in the range of 5 to 15 atomic %.

3. A process for producing a denitration catalyst for reducing nitrogen oxide according to claim 1, wherein said slurry is supported on an expanded metal lath defining openings so that the openings of the expanded metal lath are prevented from clogging with the slurry.

4. A process for producing a denitration catalyst for reducing nitrogen oxide according to claim 3, wherein said expanded metal lath is made from a stainless steel sheet and sprayed with a molten aluminum in the quantity of 50 to 250 g/m$^2$.

5. A process for producing a denitration catalyst for reducing nitrogen oxide according to claim 1, comprising the additional steps of:

immersing a metal substrate in said slurry after the step of adding water to the powder to prepare a slurry; and subsequently controlling the quantity of said slurry supported on said metal substrate to a range of about 100 to 200 g/m$^2$.

6. A process for producing a denitration catalyst for reducing nitrogen oxide according to claim 1 wherein the molybdenum compound includes MoO$_3$.

7. A process for producing a denitration catalyst for reducing nitrogen oxide according to claim 6 wherein MoO$_3$ is adsorbed onto TiO$_2$.

8. A process for producing a denitration catalyst for reducing nitrogen oxide according to claim 1 including the additional steps of:

immersing a metal substrate defining a plurality of openings therethrough in the slurry to support the slurry thereon after the step of adding water to the powder to prepare a slurry; and subsequently removing excess slurry to prevent the openings from being clogged with the slurry to obtain a porous catalyst comprising the metal substrate having slurry supported thereon in a range of about 100 to 200 g/m².

9. A denitration catalyst for reducing nitrogen oxide from exhaust gases, comprising:

a catalyst material including about 65-97 atomic percent Ti, about 3-20 atomic percent Mo and up to about 15 atomic percent V, the Ti present int he form of titanium oxide particles, the vanadium present in the form of vanadium oxide, and the Mo present in the form of molybdenum oxide particles, the molybdenum oxide particles adsorbed on said titanium oxide particles such that here is minimal contact between titanium oxide particles so as to prevent sintering of the titanium oxide particles, the molybdenum oxide particles being smaller than the titanium oxide particles.

10. A denitration catalyst for reducing nitrogen oxide, according to claim 9, wherein said exhaust gases include those discharged from combustion of gas or liquid fuels.

11. A denitration catalyst for reducing nitrogen oxide according to claim 9, wherein Mo is present in the range of 5 to 15 atomic %.

12. A denitration catalyst for reducing nitrogen oxide according to claim 9, wherein said catalyst material is supported on a metal substrate is a range of about 100-200 g/m², the metal substrate defining a plurality of openings to permit gas flow therethrough.

13. A denitration catalyst for reducing nitrogen oxide according to claim 11, wherein said metal substrate is an expanded metal lath made from a thin stainless steel sheet and sprayed with a molten aluminum in the quantity of 50 to 250 g/m².

14. A process for producing a denitration catalyst, comprising the steps of:

kneading a titanium oxide precursor compound, a molybdenum oxide precursor compound and a vanadium oxide precursor compound to obtain a kneaded material;

calcining the resulting kneaded material to convert the titanium oxide precursor compound to $TiO_2$ particles and to obtain a resulting calcined material including about 65-97 atomic percent Ti, about 3-20 atomic percent Mo, and up to about 15 atomic percent V, whereby the molybdenum compound is adsorbed on the surface of the titanium compound particles;

grinding the resulting calcined material to reduce the size of the particles;

adding water to the particles to form a slurry; and drying the slurry to obtain a denitration catalyst.

15. A process for producing a denitration catalyst, according to claim 14 including the additional steps of:

immersing a metal substrate defining a plurality of openings in the slurry to support the slurry thereon; and removing excess slurry from the slurry-supporting metal substrate such that the slurry is supported on the metal substrate in a range of about 100 to 200 g/m².

* * * * *